United States Patent [19]
Fischer

[11] 3,863,864
[45] Feb. 4, 1975

[54] FILM TREADING ASSEMBLY AND REWIND ACTUATOR

[75] Inventor: Joerg Fischer, Madison, Ala.

[73] Assignee: Bell & Howell Company, Chicago, Ill.

[22] Filed: Jan. 15, 1973

[21] Appl. No.: 323,620

[52] U.S. Cl. .............................. 242/192, 242/189
[51] Int. Cl. ..................... G03b 1/56, B65h 17/14
[58] Field of Search .......... 242/192, 189, 195, 205, 242/197; 352/157, 158, 159

[56] References Cited
UNITED STATES PATENTS

| | | | |
|---|---|---|---|
| 3,552,683 | 1/1971 | Bundschuh et al. | 242/192 |
| 3,684,360 | 8/1972 | Pammer | 352/159 |
| 3,685,766 | 8/1972 | Thomsen | 352/158 |
| 3,703,333 | 11/1972 | Bundschuh et al. | 352/157 |

*Primary Examiner*—George F. Mautz
*Attorney, Agent, or Firm*—John E. Peele, Jr.

[57] ABSTRACT

For a cassette loaded motion picture projector, a film handling mechanism is arranged to pivot about a first axis responsive to an elevator for stripping the leading end of a film from the adjacent convolution of a film supply means and for guiding of the film into the projector toward the projection station thereof. Alternatively, the mechanism is arranged to pivot about a second axis responsive to film tension for actuating a film rewind assembly of the projector at the end of a projection sequence as the trailing end of the film attached to the supply means causes the film between the supply means and a take-up to become taut. Also, the film stripper and a film drive are coupled to an actuator for sequential displacement to and from threading and non-threading conditions.

11 Claims, 6 Drawing Figures

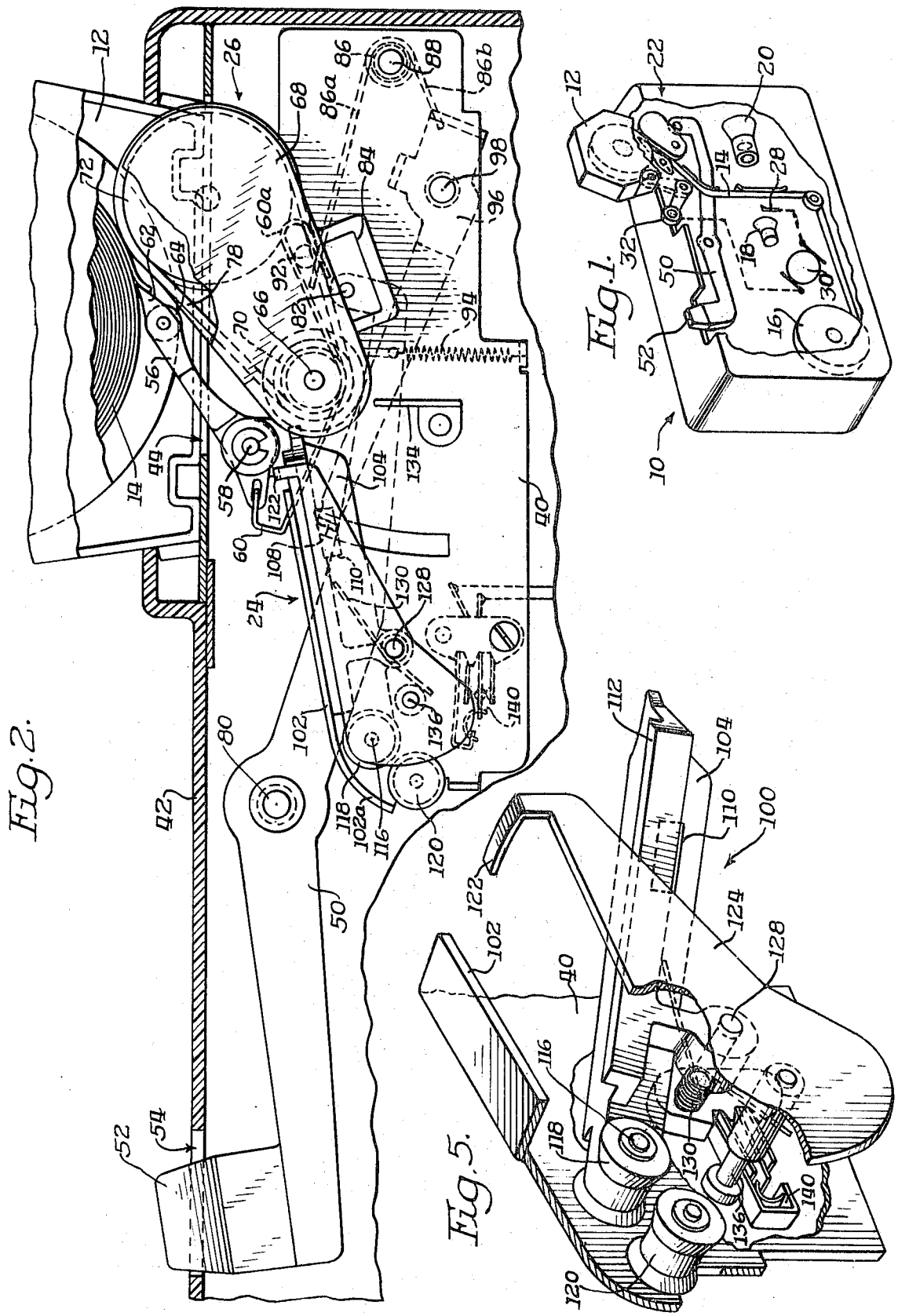

FILM TREADING ASSEMBLY AND REWIND ACTUATOR

This invention relates generally to a motion picture projector and more particularly relates to a film handling mechanism arranged for stripping the leading end of a film from a film supply means for guiding the film into the projector, and for activating a film rewind assembly when the stripper mechanism is actuated in response to film becoming taut along the film path at the end of a projection sequence.

A continuing theme in the development of motion picture projectors has been the reduction of manual manipulations of the film by the user. Although a particular convenience found on present day motion picture projectors is the automatic threading feature, a common approach requires the operator to place the film reel on the projector and manually insert the leading end of the film into a threading mechanism of the projector. From this point in the projector, the film is automatically transported past the projection station of the projector and onto a take-up. A recent development to further reduce the manual manipulations required and to provide for a more desirable storage facility than open reels is in the area of film cassettes. In the individual cassettes, which may be stacked together for film projection in sequence, a reel of film is enclosed, and thereby protected against accumulation of dust on the film.

With respect to cassette loaded automatic threading projectors, the leading end of the film is usually wound within the confines of the cassette and must be stripped from the outer convolution of film within the cassette by automatic means before being transported into and through the projector. It will be appreciated that the film roll on the reel in the cassette may be of any length, between a maximum and a minimum, which the projector threading mechanism is designed to handle. In projectors of the class in question, the stripping process is usually accomplished by a wedge shaped stripper which rides upon the outer surface of the film stripping the leading end from adjacent convolutions. A film drive cooperates with the stripper to force the film along the threading path and into the projector for transport of the film toward the take-up. Generally, a separate mechanism is necessary to sense the tension in the film required for actuation of the projector for initiation of a rewind sequence.

Another improvement by which manual handling of film is reduced is the automatic rewind feature by which film is caused to be rewound into the cassette at the completion of a projection sequence. A primary method of causing automatic rewind to be initiated is to attach the trailing end of a film to the supply to cause an increase in tensison between the film transport and the supply when the end of a film projection sequence is reached. To reduce the possibility of film damage during high speed rewind operation, the substantially straight line rewind path is desirable to reduce the tendency of film to break under the increased strain caused by pulling the film at higher torques and speeds.

The present projector seeks to overcome the separate mechanism required for film stripping and rewind actuation by providing a dual function mechanism arranged for stripping the leading end of a film from the adjacent convolution of a film supply, and for sensing film tension. In addition to stripping film from the supply, the mechanism guides the film into the projector along a substantially straight line threading path. Such a path functions to reduce the incidence of misthreading and to enable the film to be fed to the projection station of the projector with less probability of buckling than might occur in a threading path having several undulations. From the projection station, the film is transported to a take-up. Alternatively, the mechanism functions as an end of projection sensor as the film transport and take-up cause the film between the supply means and take-up to become taut since the trailing end of the film is attached to the supply. The mechanism is arranged with one portion pivotal about a first axis for forming a film guiding channel to direct film stripped from the supply means toward the projection station when that portion is pivoted about the axis by an elevator mechanism which may be manually actuatable. A second pivot axis enables another portion of the mechanism to be displaced to a film rewind assembly activating position in response to film tension. Following rewind of the film into the cassette or supply means, the mechanism is automatically reconditioned for a subsequent film threading operation. The film stripper and a film drive are coupled to the elevator for sequential displacement to and from threading and non-threading conditions responsive to links and selected springs which cause the film drive to follow the stripper into and out of threading condition.

A primary object of this invention is to provide an improved mechanism for stripping a film leader from a reel of film and for sensing the end of a film and actuating a film rewind mechanism.

Another object of this invention is to provide an improved dual function mechanism which is manually actuated for threading of film into the projector and is automatically actuated responsive to film tension for activating the rewind mechanism of the projector.

A further object is to provide for sequential displacement of the stripper and film drive into and out of threading condition.

The above and other objects and advantages of this invention will become obvious from the following description of a preferred embodiment when considered in conjunction with the accompanying drawings.

DESCRIPTION OF THE DRAWINGS

FIG. 1 is a highly schematic perspective view of a motion picture projector on which the mechanism of the invention may be mounted.

FIG. 2 is an elevational view of a portion of a film cassette in cooperation with a projector showing the threading assembly of the invention with parts in section and parts fragmentarily illustrated for clarity.

FIG. 5 is an enlarged perspective view of a portion of the mechanism to more clearly illustrate certain features.

DESCRIPTION OF THE ILLUSTRATED EMBODIMENT

Figure 3:
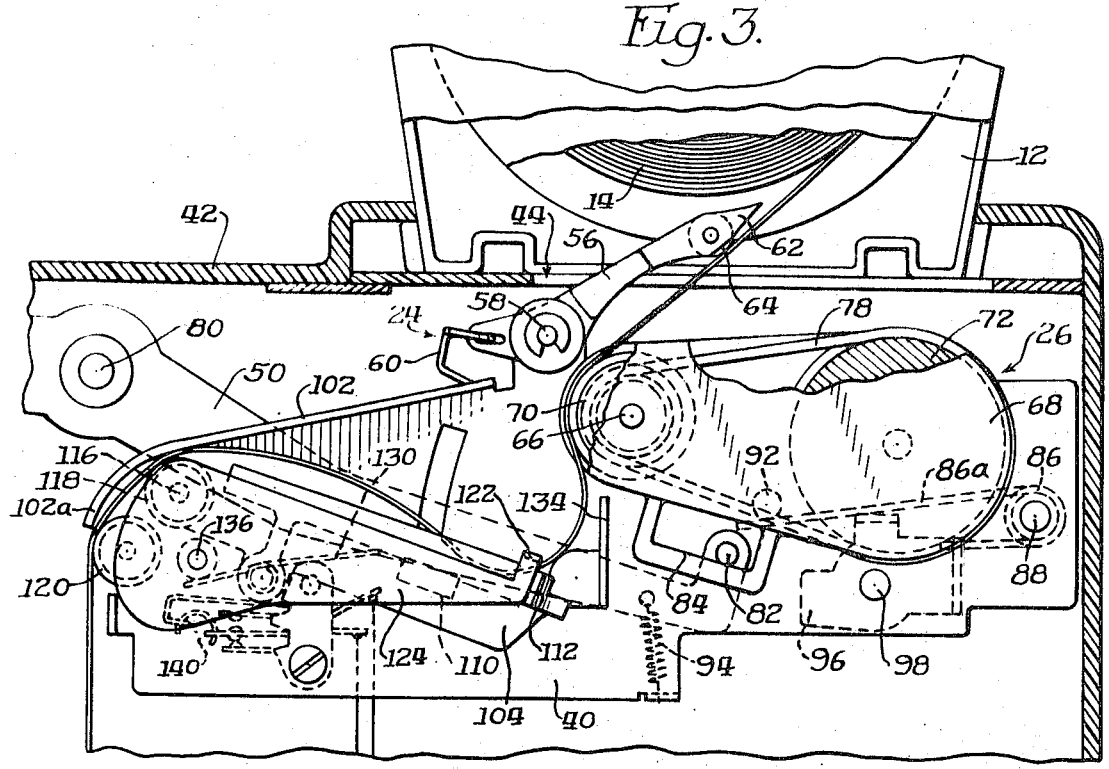
FIG. 3 is a similar elevational view with portions of the mechanism in a position different from the position shown in FIG. 2.

Referring first to FIG. 1, a motion picture projector 10 is shown having arranged thereon a film supply in the form of a cassette 12 from which film 14 is transported toward a film take-up, shown as a reel 16. In a known manner, not shown, the trailing end of the film is attached to the hub of the reel. Intermediate the film supply and the film take-up, a film projection station is shown schematically as a lamp 18 and a projection lens 20. To feed film from the supply 12, a threading mechanism 22 including a stripper assembly 24 and a film drive assembly 26 is movable from a non-threading condition to a film threading condition whereby the leading end of the film is automatically withdrawn from the cassette 12, and fed toward a shuttle 28 proximate the projection station. Powered components of the projector are driven by a drive motor shown schematically at 30, which motor is connected to the components by the usual mechanical connections, represented by dashed lines. After the film has been introduced into the projector, the film transport mechanism or shuttle 28 drives the film toward the take-up along the remainder of a substantially conventional guide path. A puck drive 32 represents a rewind mechanism for the projector. The puck is introduced into the cassette to engage a flange of the reel for rewinding of the film onto the reel after the length of film has been projected. When the end of the film is rewound into the cassette, the cassette may be replaced for another projection sequence.

As shown in more detail in FIGS. 2–4 and 6, the film stripper assembly 24 and the film drive assembly 26 of the film threading mechanism 22 are arranged on a mechanism support plate 40 of the projector 10. During projector operation sequences other than threading, these assemblies are enclosed within the projector housing 42 in alignment with a film access opening 44 formed in the casing. For threading of film into the projector, a cassette 12 is aligned on the casing with the access opening 44 to permit entry of the film threading mechanism into the cassette for engagement of film as shown in FIG. 2, and to permit feeding of film into the projector. In this embodiment, portions of the stripper assembly and drive assembly are elevated into the cassette by a threading actuator lever 50 having a control button portion 52 extending through a cutout 54 in the casing.

The stripper assembly 24 includes a stripper member 56 pivoted about an axle 58 which is mounted on an upper portion of the mechanism support plate 40. A dual action spring 60 is connected to an end of the stripper member 56 adjacent the axle to bias the stripper member into both non-operating and operating positions, as described hereinafter. Adjacent the operative end of the stripper member is mounted a pointed film separator or nose portion 62 which is held against the film under the biasing of spring 60 when the stripper member is in threading condition. At the juncture of the nose portion and stripper member is carried a roller 64 which rides on film stripped from the supply to prevent damage to the film as it is fed past the stripper member.

Proximate the stripper assembly 24, the film drive assemblly 26 is mounted pivotably about a shaft 66 fixed in the mechanism support plate 40. The drive assembly includes a plate-like belt carrier or feed panel 68 on which a pair of pulleys 70, 72 are supported. A drive belt 78, entrained about the peripheral grooves of the pulleys, is arranged to extend beyond the belt carrier to engage film when elevated for a threading sequence. The pulley 70 at the end of the carrier 68 of the drive assembly, proximate the pivot shaft 66, is arranged relative to the carrier so that the belt is substantially enclosed in the carrier and the film is guided on the carrier alone. With the film drive assembly 26 raised for engagement with the film, the leading end of the film is driven against the separator 62 thereby causing that end to be separated from the adjacent convolution. Until introduction of the film into the projection station, the film continues to be driven by the belt along a path between the stripper member and the drive assembly.

The threading actuator lever 50 is mounted within the casing of the projector for movement about an axis shown as a shaft 80. On the end of the lever opposite the externally extending button portion 52, a stud 82 is arranged for cooperation with the film drive assembly 26. The stud 82 extends from the lever into a slot or receiver 84 formed in the belt carrier 68 as a lost motion connection whereby the lever can move through a limited arc without actuating the film drive assembly. Downward displacement of the lever button portion 52 causes the stud 82 on lever 50 to move up allowing the belt carrier to follow. A coiled spring 86 about a shaft 88, fixed in the mechanism support plate 40, has one end 86a which urges the carrier against the stud 82. This tendency lift is occasioned by engagement of spring end 86a against a lug 92 which extends from the surface of the carrier into the path of the spring end. Hence, this spring 86 and the lost motion connection allow the belt 78 to engage the film with a force independent of the force applied to the lever 50. That is, the lever bottoms out before the stud 82 can push the belt carrier against the film. A torsion spring 94 is connected to the lever to bias the lever to a non-threading condition, thereby returning the button 52 of the actuator lever and belt carrier 68 to its undepressed condition.

Upon activation of the threading actuator lever 50, the stud 82 is lifted to engage the belt carrier 68 with the film. As the carrier is raised the spring 86 in engagement with stud 92 is rotated clockwise as shown in FIG. 2. The spring 60 having a U-shaped end 60a looped around the stud 92 causes the stripper member 56 to be moved likewise. That is, as the belt carrier is raised, stud 92 influences the spring 60 to rotate the stripper member into engagement with the film before the movement of the belt carrier is complete. After threading of film is complete, the stripper is biased by the spring 60 against the film. When the actuator lever is released for movement to the non-threading condition, the carrier and therefore the stud 92 cause the springs 60 and 86 to be displaced for movement of the components to which they are connected.

A film guide return link member 96 is actuated simultaneously with the return of the threading actuator lever 50 and the filmm drive assembly 26 from their respective threading conditions. The other end 86b of the coiled spring 86 is connected with an end of the return link member to one side of the pivot axis 98, on which the link member is mounted. As the stud 82 on the lever 50 is lowered, the initial movement is in the free path within the slot, followed by engagement with the slot perimeter walls to lower the carrier. Thereafter, the stud engages the link member 96 to positively displace the member to a non-threading condition.

Figure 4:
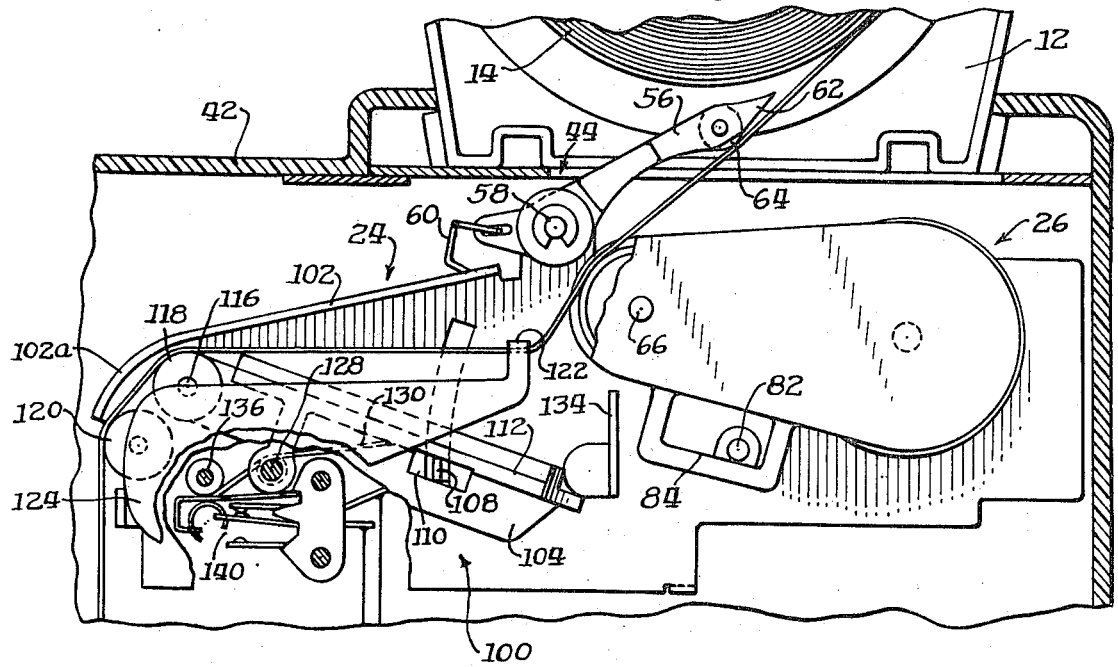
FIG. 4 is an elevational view similar to the views in FIGS. 2 and 3, and showing the mechanism in another operational condition.
Figure 6:
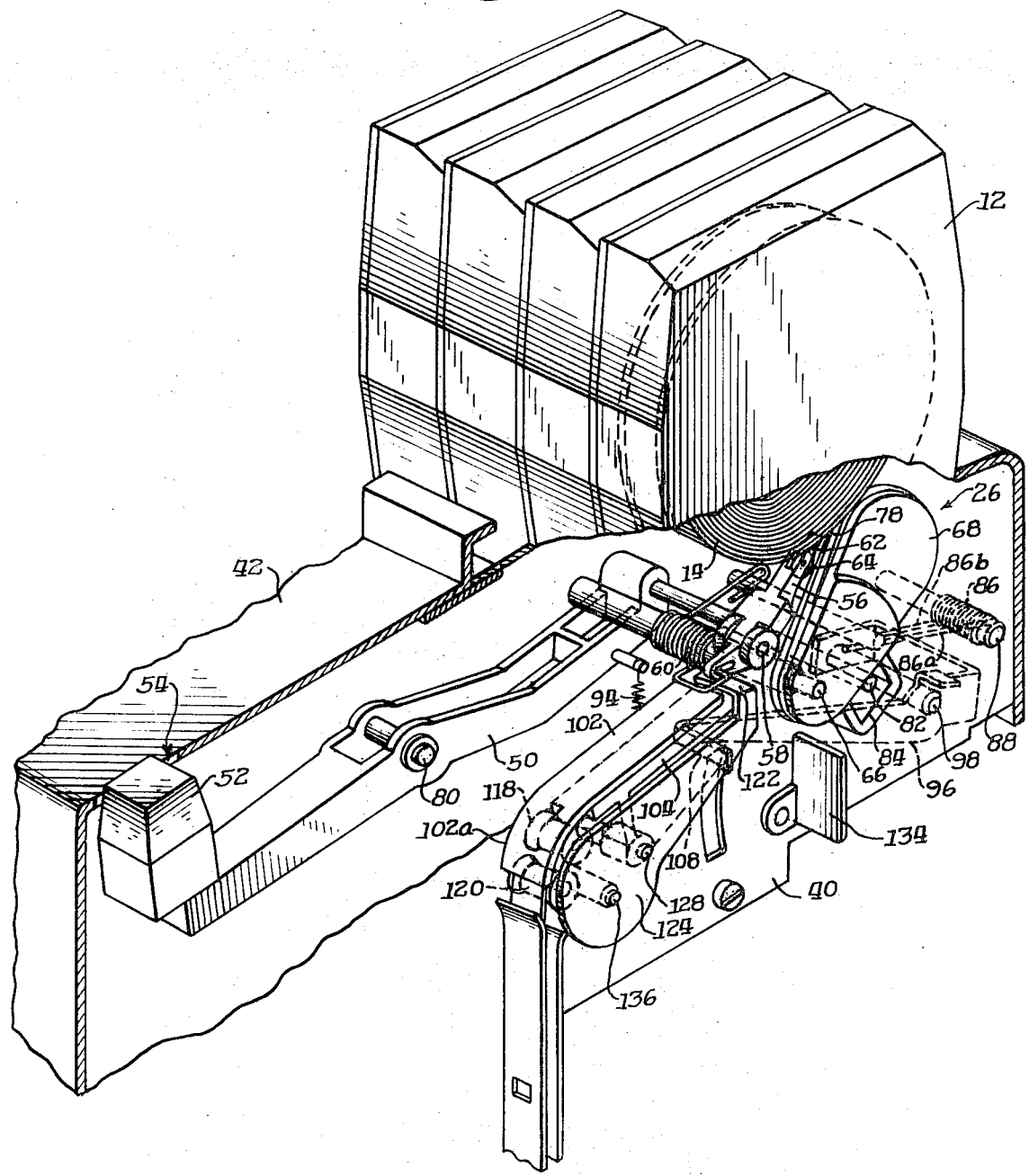
FIG. 6 is a perspective view of the mechanism of the invention.

Adjacent the exit end of the film path formed between the stripper member 24 and the film drive assembly 26, a film guide channel assembly 100 is located. This channel assembly includes an upper channel guide portion 102 which is formed by an elongated ledge portion bent from the mechanism support plate 40. This ledge portion is substantially planar but terminates with an arcuate film exit end 102a whereby film is turned toward the projection station. To cooperate with this fixed upper channel portion, a pivoted lower channel film guide portion 104 is arranged for movement about a threading position as shown in FIG. 2 and a normal operating position as shown in FIGS. 3 and 4. By actuation of the threading actuator lever 50, the lower channel portion 104 is permitted to be raised into a predetermined spaced relation with respect to the upper channel guide portion by the lifting of the end of the film guide return link 96 and spring 86b. A finger 108 on the return link extends into a cutout 110 in the lower guide portion to pivot that portion. As seen more clearly in FIG. 5, a ledge 112 extending from the upper surface of the lower chanel portion 104 forms an outer channel guide surface to maintain the alignment of film moved through the channel. The lower channel portion 104 is supported pivotably about a shaft 116 defining a primary axis adjacent the film exit end of the channel portion. Carried about the axle is a film roller 118 about which the film passes during normal projector operations. From roller 118, the film is guided by the arcuate portion of the upper guide channel over the roller 120, and toward the projection station of the projector.

Proximate the film entry end of the film guide channel 100 is positioned a slightly arcuate finger member 122 of a rewind film sensor 124, under which the film passes upon entry into the film guide channel. The sensor is pivoted about an axis 128 carried movably by the lower channel portion 104 intermediate its ends, and can be rocked as film tension causes the film to lift finger 122. A coiled spring 130 about this axis has one leg engaging the lower channel portion thereby causing the other leg to bias the rewind sensor to a non-threading position as shown in FIG. 3. Biasing by the latter spring leg occurs as the leg engages a switch contact stud 136 fixed to the sensor member radially of the axis about which the sensor pivots and radially of the axis about which the channel portion pivots. The arrangement of these pivots causes the contact stud on the sensor to move toward a circuit closing condition only when the channel portion is in non-threading condition.

To activate the rewind mechanism 32 of the projector, a normally open circuit (not shown) is provided having a switch 140 arranged to complete the circuit when required. The switch is fixed to the mechanism support plate 40 in the path of the contact engaging member 136 carried by the sensor. When the circuit is completed, the rewind drive of the projector is actuated, in this embodiment, causing the reel drive puck 32 to be lifted from the solid line position in FIG. 1 to the dotted line position. Also, necessary mechanical connections are made at the same time to cause the motor 30 to power the puck until the circuit is de-energized.

Threading of the projector is initiated by the operator depressing actuator button 52 after positioning a film supply 12 on the projector. The threading mechanism including the stripper assembly 24 and the film drive assembly 26 are elevated into film stripping condition. The leading end of the film is driven by the belt 78 against and past the stripper member 56 to move from the supply into the guide channel means 100 toward the projection station and the take-up. As the operator detects the presence of the leading film end at the projection station, the button 52 of the actuator lever is released thereby retracting the stripper assembly and film drive assembly. The retraction is caused through the action of the stud 82 in the lost motion connection with the receiver slot 84 formed with the carrier 68. As the carrier is lowered, the stud 82, extending from the lever 50 contacts the edge on film guide return link 96 and pushes the lower channel guide portion 104 to the position as shown in FIGS. 3 and 4. As the belt carrier lowers, tensioning of the leg of spring 60 about stud 92 causes the other end of the spring to bias the film stripper 56 against the film. By the interconnection of spring 60 between the film stripper and the belt carrier, the stripper is raised against the film roll before the belt, and is lowered against the stripped film before the belt is withdrawn.

With the film threaded into the projector system, and the actuating lever released, the film guide channel 100 has opened to allow an additional length of film to form a loop between the upper and lower channel portions. Forming of this loop, required for steady film projection, is enhanced by the slightly arcuate finger 122 of the rewind film sensor 124 which extends over the film adjacent the entry end of the lower channel member. This rewind film sensor, supported for pivotal movement and biased toward non-threading condition, pulls a few film frames from the supply as the lower channel portion is displaced to non-threading condition. A small stop 134 is fixed to the mechanism support plate 40 in the path of the loop to preclude the loop from escaping from the desired film path should a film jam occur during a threading operation. The contact stud 136 of the film rewind sensor moves through a limited arc as the sensor pivots and functions as a snubber due to film being pulled by the shuttle 28 of the projector. The spring coiled about the sensor pivot axis urges the sensor into non-threading condition and tends to maintain the contact stud 136 on the sensor away from the rewind switch 140. However, when the end of a film is reached, the added tension caused by the pull of the shuttle and take-up against the film, the end of which is retained in the supply 12, causes the film proximate the sensor finger to again approach a straight line. As the film lifts the finger 122 and pivots the sensor about axis 128, the contact stud actuates the switch to complete the rewind circuit through lines 200 and 201. That is, when the projector is functioning at normal operating conditions, a circuit is available for completion by the switch. This circuit is completed when tension is increased in the film causing the film rewind sensor to be lifted from the position as shown in FIG. 3 to the position as shown in FIG. 4. Only when the end of a film is reached is the loop shortened significantly to cause pivoting of the film rewind sensor about the axle and thereby to cause lowering of the pin into contact making engagement with the switch 140. After rewind is initiated, the film end is eventually reached causing the rewind sensor to be released to terminate the rewind operation of the projector. The cassette may then be readily removed from the projector, and a new cassette positioned in its place.

The embodiment shown is illustrative of the principle of operation of a dual action film threading and rewind sensing mechanism, and an improved film threading mechanism. Certain changes, alterations, modifications and substitutions can be made in the construction of the mechanism without departing from the spirit of the invention.

What is claimed is:

1. In a motion picture projector operable in normal projection modes, in a threading mode and in a film rewind mode, the projector having a film supply to which the trailing end of a film is attached, means for transporting a length of film from the film supply, a film take-up for winding up a length of film, and rewind means for returning the length of film to the film supply, a film threading and rewind conditioning assembly comprising:
  film drive means for transporting film from said film supply toward said take-up; means supporting said film drive means for movement between a threading condition in engagement with film in the film supply and a non-threading condition;
  film stripper means for removing the leading end of a film from said film supply;
  means supporting said stripper means for movement between a threading condition in engagement with film in the film supply and a non-threading condition;
  a film guide channel means for guiding film from said stripper means and having a portion movable about a first axis between a threading condition and a non-threading condition; and
  said movable film guide channel portion supporting a second axis for movement therewith;
  a film tension sensor mounted on said second axis and movable with said movable channel portion when said channel portion is in said threading condition and movable independently of said movable channel portion about said second axis to actuate said film rewind means responsive to film tension when said movable channel portion is in said non-threading condition.

2. Apparatus as in claim 1 wherein said film tension sensor includes a finger under which film passes during normal projection modes, said finger being engaged by film responsive to tension when said film transport means of said projector tends to pull the trailing end of the film from the film supply.

3. Apparatus as in claim 1 including means to move said film stripper means and said film drive means sequentially into and out of threading condition.

4. Apparatus as in claim 1 including actuator means for initiating conditioning of said projector for a threading sequence, said actuator means being operatively coupled to said film drive means and said film stripper means to displace same to threading condition.

5. Apparatus as in claim 4 wherein said actuator means is operatively coupled with said film stripper means and said film drive means to remove same to non-threading condition.

6. Apparatus as in claim 5 including means coupling said actuator means with said stripper means and said film drive means for moving said stripper means into threading condition before said film drive means is moved into said threading condition and for moving said film drive means from said threading condition is said same sequence.

7. In a motion picture projector having film supply means to which the trailing end of a film is attached, means for transporting a length of film from the film supply means, a film take-up means, and rewind means for returning the length of film to the supply means, film stripping and feeding apparatus comprising:
  actuator means for initiating conditioning of said projector for a threading sequence and for terminating said sequence;
  a film stripper mounted on an axis for pivotal movement from a non-threading condition to a threading condition in engagement with film in said supply means;
  film drive means arranged for movement from a non-threading condition to a threading condition in engagement with film in said supply means;
  film guide channel means for guiding film from said stripper including a movable portion displaceable from and to threading condition;
  spring means for coupling said actuator means with said stripper and said film drive means for moving said stripper means into threading condition before said film drive means is moved into threading condition and for moving said stripper means and said film drive means from said threading condition in said same sequence; said spring means biasing said stripper into threading condition responsive to operation of said actuator means and alternatively biasing said stripper from said threading condition; and
  link means cooperating with said spring means for driving said drive means into non-threading condition, said link means being pivotably supported and connected to said pivotal portion of said film guide channel means for displacing same to threading and non-threading conditions.

8. Apparatus as in claim 7 wherein said actuator means is coupled to said drive means by a lost motion connection.

9. Apparatus as in claim 8 wherein said actuator means is manually operable lever means mounted for pivotal movement, said lever means being in lost motion connection with said film drive means, and being engageable with said link means for returning said film drive means to non-threading condition.

10. In a motion picture projector having film supply means to which the trailing end of a film is attached, means for transporting an elongated length of film from the film supply means, a film take-up means, and rewind means for returning the length of film to supply means a stripper apparatus comprising:
  a film stripper member for separating film from said supply means arranged in said projector adjacent a film access through which film is guided from said supply means;
  a film guide channel including a movable film guide means arranged adjacent said stripper member for guiding film toward said film transport means of said projector;
  an axis supporting said movable guide means for pivotal movement to and from a film threading condition;

an axis supported on said movable guide means for pivotal movement between a film threading condition and a non-threading condition; and a film rewind sensor mounted on said pivotal movable axis for actuation by film tension when said film guide means is in said non-threading condition; said sensor including a lifter finger under which film passes during normal projection modes, said finger being engaged by film responsive to tension when said film transport means of said projector tends to pull the trailing end of said film from said supply means.

11. Apparatus as in claim 10 including means for biasing said film rewind sensor against movement; and switch means in electrical circuit connection for activating the rewind means of said projector when said film lifts said finger due to end of projection tension on the film.

* * * * *